United States Patent
Vedula et al.

(10) Patent No.: US 8,412,931 B2
(45) Date of Patent: Apr. 2, 2013

(54) TECHNIQUES FOR CREDENTIAL STRENGTH ANALYSIS VIA FAILED INTRUDER ACCESS ATTEMPTS

(75) Inventors: Srinivas Vedula, Orem, UT (US); Cameron Craig Morris, Saratoga Springs, UT (US)

(73) Assignee: Apple Inc., Cupertino, CA (US)

( * ) Notice: Subject to any disclaimer, the term of this patent is extended or adjusted under 35 U.S.C. 154(b) by 1262 days.

(21) Appl. No.: 11/964,933

(22) Filed: Dec. 27, 2007

(65) Prior Publication Data

US 2009/0172788 A1 Jul. 2, 2009

(51) Int. Cl.
*G06F 21/00* (2006.01)

(52) U.S. Cl. .......................................... 713/161

(58) Field of Classification Search .................. 726/1–7, 726/14, 18–19, 21–27, 30; 713/161, 168, 713/172, 182–184, 188, 193–194; 711/164; 705/67, 72, 75, 76, 18; 709/223–225; 707/705, 707/723, 758
See application file for complete search history.

(56) References Cited

U.S. PATENT DOCUMENTS

| | | | |
|---|---|---|---|
| 7,085,936 B1 | 8/2006 | Moran | |
| 7,103,542 B2 * | 9/2006 | Doyle | 704/231 |
| 7,523,499 B2 * | 4/2009 | Wilkins et al. | 726/23 |
| 7,725,589 B2 * | 5/2010 | Nicodemus et al. | 709/229 |
| 7,793,335 B2 * | 9/2010 | Bali et al. | 726/2 |
| 7,802,104 B2 * | 9/2010 | Dickinson et al. | 713/182 |
| 7,882,555 B2 * | 2/2011 | Ben-Itzhak | 726/13 |
| 2005/0188222 A1 | 8/2005 | Motsinger et al. | |
| 2006/0037064 A1 | 2/2006 | Jeffries et al. | |
| 2007/0101440 A1 | 5/2007 | Bhatia et al. | |

OTHER PUBLICATIONS

Gilleland, Michael, "Levenshtein Distance, in Three Flavors", http://www.merriampark.com/ld.htm, 14 pgs.

* cited by examiner

*Primary Examiner* — Kambiz Zand
*Assistant Examiner* — Leynna Truvan
(74) *Attorney, Agent, or Firm* — Blakely, Sokoloff, Taylor & Zafman LLP

(57) ABSTRACT

Techniques for credential strength analysis via failed intruder access attempts are presented. Intruders attempting to access a secure network with failed credentials are monitored. The failed credentials are retained and evaluated in view of previously recorded failed credentials. Credential policy is updated in response to the evaluation and intruder trends and sophistication levels are also predicted in response to the evaluation.

23 Claims, 3 Drawing Sheets

TECHNIQUES FOR CREDENTIAL STRENGTH ANALYSIS VIA FAILED INTRUDER ACCESS ATTEMPTS

BACKGROUND

Most enterprises implement password/security administration for their online resources. One technique, which nearly everyone is familiar with, is the use of a front-end password or authentication service. The password service attempts to ensure that only authorized users can penetrate a firewall of the enterprise and access certain firewall-protected resources.

One situation where this is readily apparent is when a remote employee tries to use the Internet to log into his/her employer's secure Intranet. In such a case, the user is required to authenticate before gaining access to the Intranet via an id and password combination that a password service uses to authenticate the user and perhaps change protocol access for the user to something more secure, such as a secure socket layer (SSL) communication or a virtual private network (VPN) communication.

Security administrators often attempt, as best they can, to establish password policies that prevent users from setting their passwords to something that may be easily hacked by intruders. This means that the administrators have to attempt to get inside the mind of potential intruders and second guess what those intruders may try to hack into the enterprise's secure assets. Even the most clairvoyant administrator struggles with this aspect of his/her job. The ad hoc approaches, which are often implemented on an administrator-specific basis, probably resemble more art than science and are in no way consistent or reliable.

Another approach is to rely on software programs that purport to be able to crack passwords. Here, the passwords are only as secure as the software used, since if the software cannot crack the passwords then the Administrator may get a false sense of security. Moreover, intruders are likely changing their approaches every second of the day and 365 days a year. So, it is unrealistic to think that a relatively static piece of software can provide an enterprise with the security it needs.

Thus, what is needed is a mechanism, which improves the security of access credentials for an enterprise in order to more effectively counter intruder attempts to access secure assets of that enterprise.

SUMMARY

In various embodiments, techniques for credential strength analysis via failed intruder access attempts are provided. More specifically, and in an embodiment, a method is presented for establishing a strength of a security access credential in response to failed intruder access attempts. A detection is made for a failed authentication attempt into a secure network. Next, a failed credential, which was used in the failed authentication, is acquired from an authentication service and a determination is made as to whether the failed credential falls within a defined threshold of tolerance. The failed credential, when determined to fall outside the defined threshold of tolerance, is recorded in a failed credential store. Finally, the failed credential and the failed credential store are used to resolve a strength attribute associated with one or more existing valid credentials that are used to properly authenticate to the secure network.

DETAILED DESCRIPTION

Various embodiments of this invention can be implemented in existing network architectures, security systems, data centers, and/or communication devices. For example, in some embodiments, the techniques presented herein are implemented in whole or in part in the Novell® proxy server products, operating system products, data center products, and/or directory services products (eDirectory®, etc.) distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
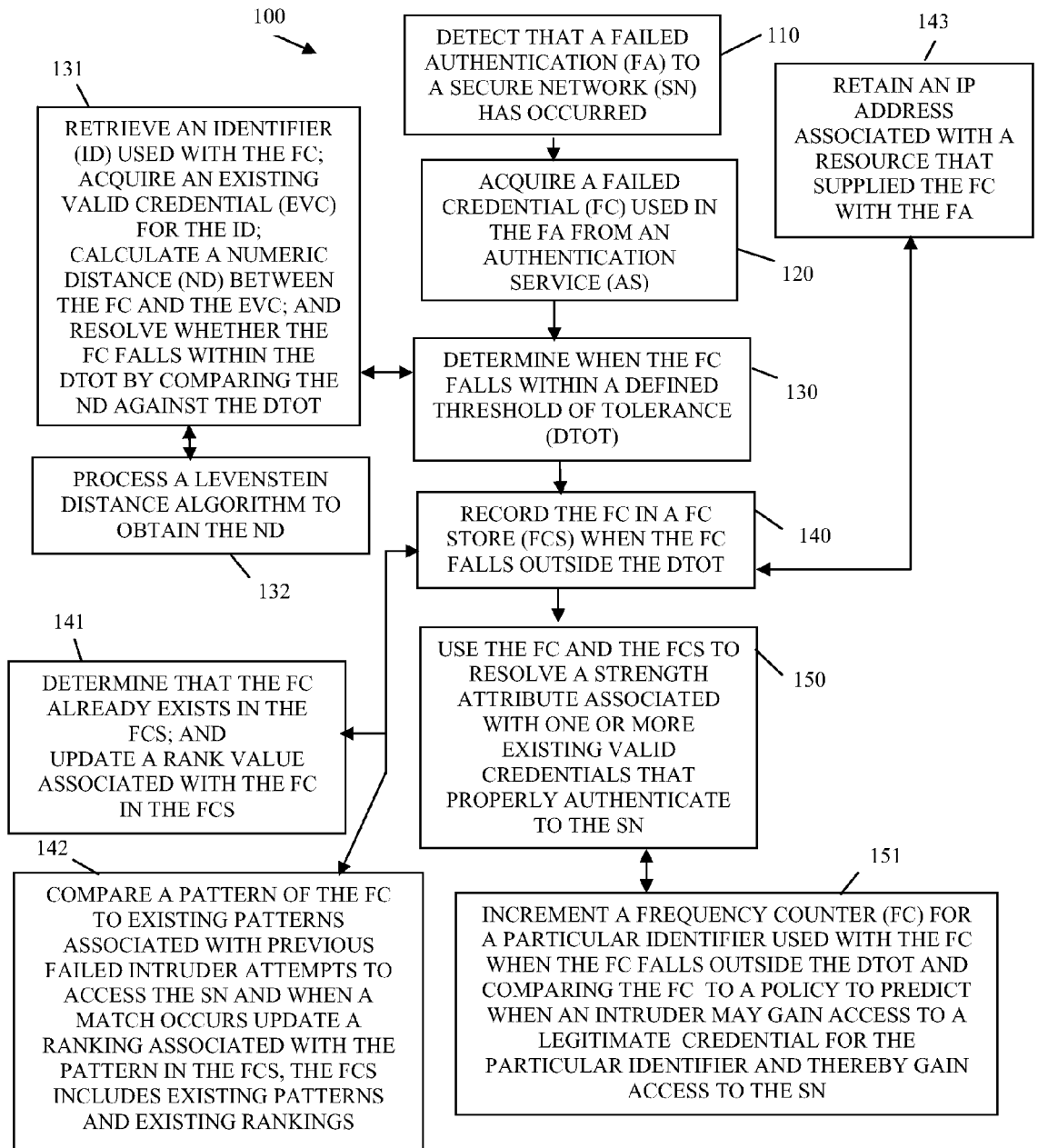
FIG. 1 is a diagram of a method for establishing a strength of a security access credential in response to failed intruder access attempts, according to an example embodiment.

FIG. 1 is a diagram of a method 100 for establishing a strength of a security access credential in response to failed intruder access attempts, according to an example embodiment. The method 100 (hereinafter "credential analysis service") is implemented as instructions in a machine-accessible and readable medium. The instructions when executed by a machine perform the processing depicted in FIG. 1. The credential analysis service is also operational over and processes within a network. The network may be wired, wireless, or a combination of wired and wireless.

Initially, the credential analysis service interacts with security services (such as a password service) for an enterprise's secure network. Users access the secure network by authenticating; once authenticated the password service supplies unique identities to the users or automated services that may also assume identities within the secure network. Each unique identity includes its own assigned roles and security access rights. The credential analysis service interacts with the security service to evaluate credentials received from legitimate users and from illegitimate resources (intruders). This evaluation provides a mechanism for improving existing strengths assigned to credentials; identifying attack patterns of intruders, and resolving new hacking techniques used by intruders in a prophylactic manner.

A "credential" as used herein can include a password, a security token, a security assertion, an authentication certificate, and the like. Essentially, a credential is any data that one of the security services (such as a password service) of the secure network uses to authenticate resources (e.g., users, automated programs/applications/services, etc.) for access to the secure network.

As used herein the term "dictionary" may be used interchangeably with "database" or "data store." The dictionary holds credentials (passwords, tokens, certificates. The secure network can include a plurality of security dictionaries. Some of these as discussed herein and below are managed and accessed by the credential analysis service. Other information may be housed with the credentials as well, such as but not limited to frequency counters, identifiers for specific users, identifiers for specific groups, etc.

It is within this context that the processing associated with the credential analysis service is now discussed with reference to the FIG. 1.

At 110, the credential analysis service detects an event indicating that a failed authentication to a secure network has occurred. This can occur in a variety of manners. For example, an authentication service (such as in one case a password service) can inform the credential analysis service of the failed authentication. Alternatively, an event can be raised within the secure network after the failed authentication, and the credential analysis service is designed to detect that event.

At 120, the credential analysis service acquires a failed credential used in the failed authentication. This is acquired from the authentication service. That is, the authentication service is modified to forward the failed credential used in the failed authentication to the credential analysis service.

At 130, the credential analysis service determines when the failed credential falls within a defined threshold of tolerance. The defined threshold of tolerance can be a predefined numeric range, such as but not limited to 0-10. If the failed credential when compared against a legitimate credential associated with an identifier supplied during the failed authentication falls within the defined threshold of tolerance, then the failed credential is viewed to have been a mistype by a legitimate user and thus the failed authentication is determined to not be associated with an intruder. This scenario can happen frequently when a legitimate user mistypes their password by a single character or forgets to uppercase a single character of the password. These situations do not warrant processing and the credential analysis service is designed to detect these situations by processing the text associated with the failed credential and determining if the supplied text is within a defined threshold of tolerance.

For example, at 131, the credential analysis service retrieves an identifier used with the failed credential. Next, the credential analysis service acquires an existing valid credential for the identifier, which was used in the failed credential. Next, the credential analysis service calculates a numeric distance between the failed credential, as presented in the failed authentication, and the existing valid credential. This numeric difference is then compared against the defined threshold of tolerance to determine whether the numeric difference falls within the acceptable and pre-defined tolerance.

One approach for the credential analysis service to use to calculate the numeric difference is to, at 132, process a Levenstein distance algorithm. This algorithm takes two strings (text), such as the failed credential and the existing valid credential as input parameters and determines a numeric distance by determining the number of deletions, substitutions, and insertions needed to take the failed credential and move it to the existing valid credential. The number returned is the numeric distance and that is compared against the defined threshold of tolerance. If falls within the defined threshold of tolerance, then the credential analysis service knows that the failed credential is most probably associated with the legitimate resource or user that just mistyped their legitimate password (existing valid credential). Again, if this is the case then processing can stop and no further analysis is needed. Assuming this not to be the case, the credential analysis service continues to process in the manners defined herein and below.

At 140, the credential analysis service records the failed credential (when the failed credential falls outside the defined threshold of tolerance). This recordation is made within a failed credential store that the credential analysis service manages and records metrics (defined more completely herein and below) for previously failed credentials.

According to an embodiment, at 141, the credential analysis service determines that the failed credential already exists in the failed credential store. When this occurs, a rank value associated with the already recorded failed credential can be updated or incremented within the failed credential store. So, one metric may be a frequency counter indicating how may times a particular failed credential have been attempted by intruders to in their attempts to access the secure network.

In an embodiment, at 142, the credential analysis service compares a pattern (another type of metric carried with the failed credential in the failed credential store) of the failed credential to existing patterns associated with previous failed intruder attempts to access the secure network with previous failed credentials. When the pattern matches one of the previous patterns, the credential analysis service updates a ranking (still another metric) associated with the pattern in the failed credential store.

The pattern can be derived in a variety of manners. For example, suppose the failed credential is a password identified by the string "Srini-1." Here, a pattern recognition algorithm can determine that this is a pattern that can be defined as: Aa+PN, where "A" represents an uppercase alphabetic character, "a+" represents two or more lowercase alphabetic characters, "P" represents a punctuation character, and "N" represents a single numeric character. The pattern formats can be carried in the failed credential store with the failed credentials or independent of the failed credentials with links to specific instances of the failed credentials. The patterns permit the credential analysis service to in a more generic fashion resolve and keep track of techniques and strategies being used by intruders because several failed attempts that have entirely different text for the used failed credentials can have the exact same pattern being used. If a consistent repeated pattern is being noted in the failed credential store, then the credential analysis service can look at the legitimate patterns of legitimate credentials within the secure network and determine which users are potentially at risk and whether a new credential policy should be enforced to no longer permit such a pattern. It is important to note that all this processing is automated and dynamic and does not require manual intervention.

In another case, at 143, the credential analysis service retains an Internet Protocol (IP) address (yet another metric type) associated with a resource that originally supplied the failed credential with the failed authentication. A policy may be enforced that blocks that IP address from ever supplying a valid credential. This can be relaxed, if desired, again based on policy.

At 150, the credential analysis service uses the failed credential and the failed credential store (and the metrics carried therein) to resolve a strength attribute associated with one or more existing valid credentials that do properly authenticate to the secure network. So, if rankings of failed credentials or failed patterns for failed credentials warrant (again via policy), the credential analysis service can match the patterns to legitimate credential patterns and downgrade strength attributes associated with those legitimate credential patterns.

It is now appreciated how by retaining and managing failed credentials in a failed credential store, the strength of existing valid credentials can be dynamically modified and security thereby increased within the secure network.

Figure 2:
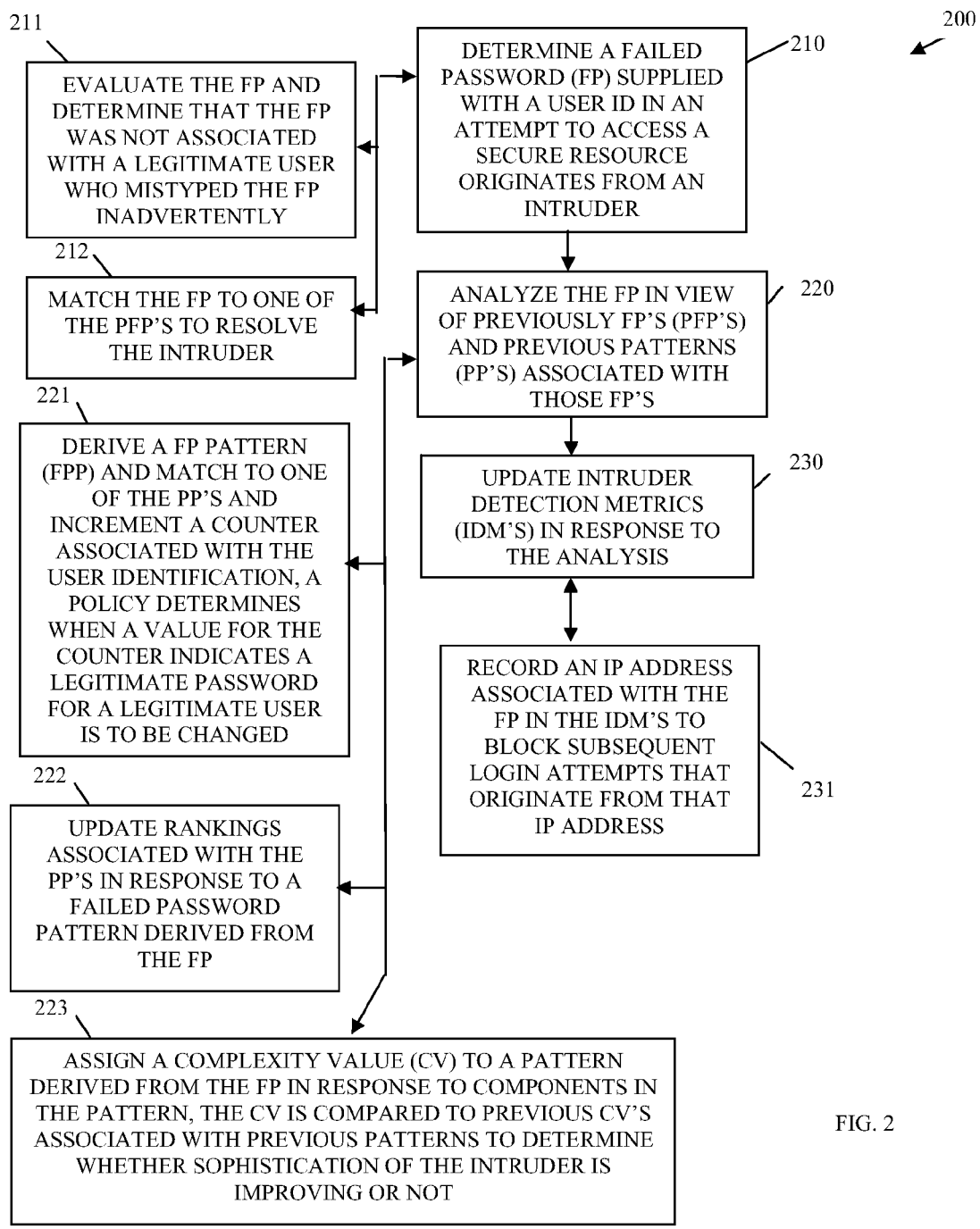
FIG. 2 is a diagram of a method for managing and using failed access credentials to strengthen security, according to an example embodiment.

FIG. 2 is a diagram of a method 200 for managing and using failed access credentials to strengthen security, according to an example embodiment. The method 200 (hereinafter "intruder analysis service" is implemented in a machine-accessible and readable medium as instructions. The instructions when executed by a machine perform the processing depicted in the FIG. 2. Moreover, the intruder analysis service is operational over a network, and the network may be wired, wireless, or a combination of wired and wireless.

The processing associated with the intruder service represents an enhanced and in some cases more detailed perspective of the credential service represented by the method 100 and described within the context of the FIG. 1.

The intruder analysis service represents a specific implementation of the credential analysis service (represented by the method 100 of the FIG. 1) for password maintenance and security.

At 210, the intruder analysis service determines that a failed password supplied with a valid user identifier (id) is being supplied by an intruder in an attempt to access a secure resource within a secure network.

In an embodiment, at 211, the intruder analysis service evaluates the failed password and determines in response to that evaluation that the failed password was not in fact associated with a legitimate user who just mistyped the failed password inadvertently. A specific approach for achieving this was discussed in detail above with reference to the method 100 of the FIG. 1.

In another case, at 212, the intruder analysis service resolves that the failed password is associated with the intruder by matching the failed password to one of the previously failed passwords from previously failed access attempts. So, if a failed password is being repeated, there is no need to do any extensive evaluation to determine if the legitimate user is associated with the failed password when the intruder analysis service can immediately match the failed password to a previously failed password associated with a previously resolved intruder.

At 220, the intruder analysis service analyzes the failed password in view of the previously failed passwords and previously recorded patterns for those previously failed passwords. The analysis is automated and can be achieved in a variety of manners.

For example, at 221, the intruder analysis service derives a failed password pattern from the failed password (discussed in detail above with reference to the method 100 of the FIG. 1. Next, the intruder analysis service attempts to match that pattern against one of the previously recorded password patterns. When a match occurs a counter associated with the user id is incremented. Next, policy can be used to determine how many attempts can be made on the user associated with this user id, such that when a value for the counter exceeds a threshold, the intruder analysis service determines that a legitimate password for the legitimate user should be changed. In other words, if a particular user is regularly being targeted by an intruder with different patterns that are relatively close to one another or with a same pattern similar to the legitimate user, then the intruder analysis service can make a prediction that a time is approaching when the legitimate password for the user should be changed. Policy may also force the legitimate user to change his/her password under these conditions. So, the intruder analysis service can proactively use the information being retained with failed passwords to make passwords of users more secure.

In still another case, at 222, the intruder analysis service updates rankings associated with the previous patterns in response to the failed password pattern derived from the failed password. This is useful because it tells the intruder analysis service the frequency or preferred patterns being attempted by intruders to in their attempts to access the secure network. The more frequently used pattern has a higher rank. Moreover, a pattern with low frequency can receive a high rank when it matches patterns of legitimate passwords contained in the secure network's password database. So, if the secure network has a password pattern that is used by a significant number of legitimate users and even a single failed password from an intruder includes that pattern, then that pattern can receive a high ranking. So, it is not just the frequency of failed password patterns but it can also be the frequency of a legitimate password pattern when compared to a particular failed password pattern that matches.

In yet another case, at 223, the intruder analysis service assigns a complexity value to a pattern derived from the failed password in response to components in the pattern. The components can include the mix and placement of different characters within the failed password. So, if the intruder supplied the following password "Srini4Vas!." The mix of usage of uppercase characters, numeric characters, and punctuation characters can be used to assign a score, such as a point for each usage giving the example a score of 5 (for the characters "S4V!."). The higher the score the more complex the pattern is believed to be. The complexity value of the failed password is then compared to complexity values associated with the previous patterns to determine whether the sophistication of the intruder is improving or not. So, in the continuing example, if the failed password receives a complexity score of 5 and the highest previously recorded complexity score was 3, then the intruder analysis service may alert an administrator to perform or re-evaluate password policy in view of an improving complexity score (moving from 3 to 5).

At 230, the intruder analysis service updates intruder detection metrics in response to the analysis. The analysis produces the metrics and they are updated to data stores, tables, dictionaries, etc. Again, the metrics can include, rankings, patterns, complexity values, frequency counters, time of day when failed passwords are being received, etc. The metrics can be dynamically mined to dynamically adjust password policy, such as denying a particular password pattern from being used when offered by a legitimate user, notifying users with bad password patterns that they will expire unless changed in a defined number of days, etc.

According to an embodiment, at 231, the intruder analysis service also records an IP address (another metric type) associated with the usage of the failed password within the intruder detection metrics. This is done to block any subsequent login attempts that originate from that particular IP address, although policy may relax this a bit if desired.

Figure 3:
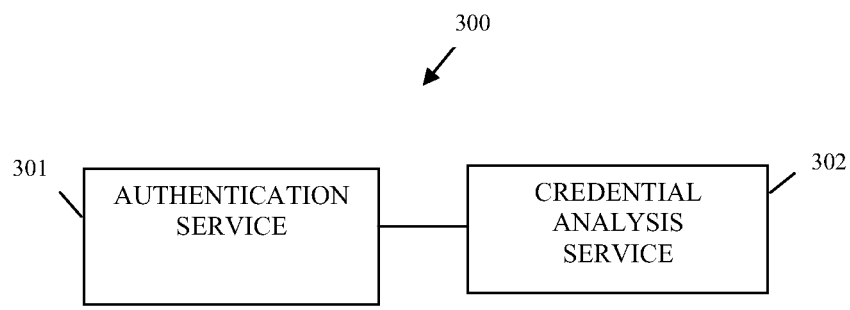
FIG. 3 is a diagram of an intruder credential analysis system, according to an example embodiment.

FIG. 3 is a diagram of an intruder credential analysis system 300, according to an example embodiment. The credential analysis system 300 is implemented as instructions on or within a machine-accessible and readable medium. The instructions when executed by a machine perform processing depicted with respect to the method 100 of the FIG. 1 and the method 200 of the FIG. 2. The credential analysis system 300 is also operational over a network and the network may be wired, wireless, or a combination of wired and wireless. In some cases the network is the Internet or a wide-area network (WAN).

The credential analysis system 300 includes an authentication service 301 and a credential analysis service 302. Each of these will now be discussed in turn.

The authentication service 301 is implemented in a machine-accessible and computer-readable medium and executes as instructions on a machine (computer, processing device, etc.). Example discussion associated with the authentication service 301 was discussed in detail above with reference to the methods 100 and 200 of the FIGS. 1 and 2, respectively.

The authentication service 301 supplies a failed credential (associated with a legitimate resource identifier) to the credential analysis service 302 when a requesting resource attempts to use the failed credential under the guise of the legitimate resource identifier for purposes of accessing a secure network.

Access to the secure network is controlled by the authentication service 301.

In an embodiment, the failed credential is a password, a digital certificate, an authentication token, or an access assertion.

The credential analysis service 302 is implemented in a machine-accessible and computer-readable medium and is to process on the machine. Example processing associated with the password term processing service 302 was described in detail above with reference to the methods 100 and 200 of the FIGS. 1 and 2, respectively.

The credential analysis service 302 determines when the requesting resource is an intruder and when the intruder is detected, the credential analysis service 302 acquires metrics associated with the failed credential and its usage by the intruder. The metrics are then updated by the credential analysis service 302 to an intruder data store. Also, the credential analysis service 302 evaluates the data store, which includes other metrics associated with other failed credentials of other intruders for purposes of adjusting strength values for legitimate credentials used within the secure network. This is done for purposes of adjusting a policy that is associated with intruder trends. Examples of this were discussed in detail above with reference to the methods 100 and 200 of the FIGS. 1 and 2, respectively.

According to an embodiment, the credential analysis service 302 processes a Levenstein distance algorithm with the failed credentials and a proper credential for the legitimate resource identifier to determine whether the requesting resource is the intruder. Examples of this were discussed above in detail with reference to the method 100 of the FIG. 1.

In an embodiment, the credential analysis service 302 acquires the metrics as: a time the intruder attempted to gain access with the failed credential; an IP address used by the intruder; a pattern derived from the failed credential; a complexity value associated with the pattern; and an indication as to a frequency with which the failed password ahs been used before with previous attempts to gain unauthorized access to the secure network; a ranking associated with the pattern; etc.

In another case, the credential analysis service 302 decreases particular strength values for particular legitimate credentials when legitimate patterns for those particular legitimate credentials match the pattern for the failed credential.

In yet another case, the credential analysis service 302 ranks a pattern complexity value for the pattern against other complexity values in the other metrics to determine whether a particular trend shows that attacks on the secure network are getting increasingly more sophisticated. Examples of this scenario were discussed in detail above with reference to the method 200 of the FIG. 2.

Figure 4:
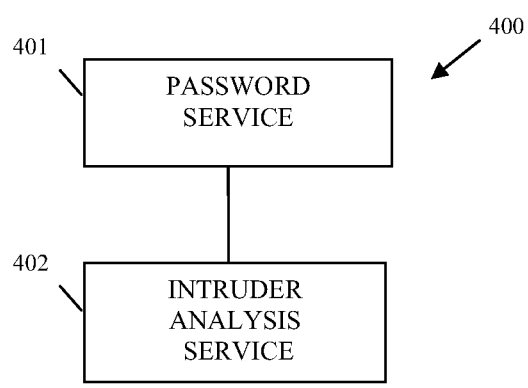
FIG. 4 is a diagram of another intruder credential analysis system, according to an example embodiment.

FIG. 4 is a diagram of another intruder credential analysis system 400, according to an example embodiment. The credential analysis system 400 is implemented as instructions on or within a machine-accessible and readable medium. The instructions when executed by one or more machines also perform, among other things; the processing depicted with respect to the method 100 of the FIG. 1 and the method 200 of the FIG. 2. The credential analysis system 400 is also operational over a network and the network may be wired, wireless, or a combination of wired and wireless.

The credential analysis system 400 includes a password service 401 and a intruder analysis service 402. Each of these will now be discussed in turn.

The password service 401 is implemented in machine-accessible and readable medium and is to process on a machine (computer, processing device, etc.). Example discussions associated with the password service were discussed above with reference to the method 200 of the FIG. 2.

The password service 401 supplies a failed password and user identifier received from a requesting user (who is attempting to login to a secure network) to the intruder analysis service 402.

The intruder analysis service 402 is implemented in a machine-accessible and computer-readable medium and is to process on the same machine as the password service 401 or an entirely different machine from that which is associated with the password service 401. Example processing associated with the intruder analysis service 402 was discussed in detail above with reference to the method 200 of the FIG. 2.

The intruder analysis service 402 evaluates the failed password, in view of a data store of failed passwords historically maintained for previously failed passwords, which were used to attempt access into the secure network. This evaluation is done for purposes of adjusting a password policy for the secure network.

In an embodiment, the intruder analysis service 402 determines whether a pattern associated with the failed password matches known patterns used by intruders and when a match occurs rankings associated with the known patterns are updated accordingly. This situation was also discussed in detail above with reference to the methods 100 and 200 of the FIGS. 1 and 2.

According to an embodiment, the intruder analysis service 402 uses the pattern to derive a complexity value for the failed password and compares that complexity value against other complexity values for the known patterns. This is done to determine whether attacks on the network are getting more or less sophisticated. Again, this was discussed in detail above with reference to the method 200 of the FIG. 2.

In another case, the intruder analysis service 402 predicts a projected time that an intruder may compromise a valid password for a valid user. The valid user is associated with the user identifier supplied with the failed password. The intruder analysis service 402 also updates policy to cause the valid user to be notified that the valid password should be changed to avoid it being compromised in the future. Examples of this were discussed in detail above with reference to the methods 100 and 200 of the FIGS. 1 and 2, respectively.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A machine-implemented method implemented in a non-transitory machine-readable medium and for execution on a machine, comprising:
   detecting, by the machine, that a failed authentication to a secure network has occurred;
   acquiring, by the machine, a failed credential used in the failed authentication from an authentication service, the failed authentication included a valid user identifier and the failed credential and automatically deriving a failed pattern used with the failed authentication;
   determining, by the machine, when the failed credential falls within a defined threshold of tolerance, the defined threshold of tolerance is a numeric range, a numeric value for the failed credential is obtained by comparing the failed credential and its failed pattern against a legitimate credential having a legitimate pattern for the valid user identifier and determining when the numeric value falls within the numeric range or outside the numeric range;
   ignoring, by the machine, the failed credential when the numeric value falls within the numeric range by assuming an instance where a valid user for the valid user identifier has mistyped a part of the legitimate credential with the failed credential;
   recording, by the machine, the failed credential and failed pattern in a failed credential store when the numeric value associated with the failed credential falls outside the numeric range; and
   using, by the machine and in accordance with a policy, when the numeric value associated with the failed credential falls outside the numeric range, the failed credential and other entries for other failed credentials in the failed credential store to resolve a strength attribute associated with the legitimate credential or one or more existing valid credentials that properly authenticate to the secure network, and dynamically modifying the strength attribute associated with the legitimate credential or one or more existing valid credentials to increase security within the secure network.

2. The method of claim 1, wherein determining further includes:
   retrieving the valid user identifier used with the failed credential;
   acquiring the legitimate credential for the valid user identifier;
   calculating a numeric distance between the failed credential and the legitimate credential; and
   resolving whether the failed credential falls within the numeric range by comparing the numeric distance against the numeric range.

3. The method of claim 2, wherein calculating further includes processing a Levenstein distance algorithm using the failed credential as one parameter to the algorithm and the legitimate credential as another parameter to the algorithm to obtain the numeric distance.

4. The method of claim 1, wherein recording further includes:
   determining that the failed credential already exists in the failed credential store; and
   updating a rank value associated with the failed credential in the failed credential store.

5. The method of claim 1, wherein recording further includes, retaining an Internet Protocol (IP) address associated with a resource that supplied the failed credential with the failed credential in the failed credential store.

6. The method of claim 1, wherein using further includes incrementing a frequency counter associated with the valid user identifier used with the failed credential when the failed credential falls outside the numeric value and comparing the frequency counter to another policy to predict when an intruder may gain access to the legitimate credential for the valid user identifier and thereby gain access to the secure network.

7. A machine-implemented method implemented in a non-transitory machine-readable medium and for execution on a machine, comprising:
   determining, by the machine, a failed password supplied with a valid user identification in an attempt to access a secure resource, the failed password and the valid user identification originates from an intruder;
   automatically analyzing, by the machine, the failed password in view of previous failed passwords and previous patterns associated with those failed passwords, the previous patterns automatically derived and retained with the failed passwords for the analysis; and
   updating, by the machine, intruder detection metrics in response to the analysis, the intruder detection metrics include rankings and patterns for the failed passwords and are used for dynamically adjusting password policy.

8. The method of claim 7, wherein determining further includes evaluating the failed password and determining that the failed password was associated with a legitimate user, to which the user identification is associated, who mistyped the failed password inadvertently.

9. The method of claim 7, wherein determining further includes matching the failed password to one of the previously failed passwords to resolve the intruder.

10. The method of claim 7, wherein analyzing further includes deriving a failed password pattern and matching it with one of the previous patterns and in response thereto incrementing a counter associated with the user identification, wherein a policy determines when a value for the counter indicates that a legitimate password for a valid user who is associated with the valid user identification is to be changed to avoid subsequent detecting by the intruder.

11. The method of claim 7, wherein analyzing further includes updating rankings associated with the previous patterns in response to a failed password pattern derived from the failed password.

12. The method of claim 7, wherein analyzing further includes assigning a complexity value to a pattern derived from the failed password in response to components of the pattern, and wherein the complexity value is compared to previous complexity values associated with the previous patterns to determine whether sophistication of the intruder is improving or not.

13. The method of claim 7, wherein updating further includes recording an Internet Protocol (IP) address associated with the failed password in the intruder detection metrics to block subsequent login attempts that originate from that IP address.

14. A system, comprising:
   an authentication service implemented in a non-transitory machine-accessible and computer-readable medium and that executes on a machine;

the credential analysis service implemented in a non-transitory machine-accessible and computer-readable medium and to process on the machine or a different machine;

wherein the authentication service is to supply a failed credential, which is associated with a legitimate resource identifier, to the credential analysis service when a requesting resource attempts to use the failed credential under the guise of the legitimate resource identifier for purposes of accessing a secure network, and wherein the credential analysis service is to determine when the requesting resource is an intruder and when the intruder is detected, the credential analysis service dynamically and automatically acquires metrics associated with the failed credential and its usage by the intruder and updates an intruder data store, and wherein the credential analysis service evaluates the data store having other previously dynamically and automatically derived metrics associated with other failed credentials and other intruders for purposes of adjusting strength values for legitimate credentials used in the secure network and for purposes of dynamically and automatically adjusting a credential policy that is derived from intruder trends, the credential policy for usage of the legitimate credentials.

15. The system of claim 14, wherein the failed credential is one of the following: a password, a digital certificate, an authentication token, and an access assertion.

16. The system of claim 14, wherein the credential analysis service processes a Levenstein distance algorithm with the failed credential and a proper credential for the legitimate resource identifier to determine whether the requesting resource is the intruder.

17. The system of claim 14, wherein the credential analysis service acquires the metrics as a time the intruder attempted access with the failed credential, an Internet Protocol (IP) address used by the intruder, a pattern derived from the failed credential, a complexity value associated with the pattern, and an indication as to a frequency with which the failed password has been used before in previous attempts to gain unauthorized access to the secure network.

18. The system of claim 17, wherein the credential analysis service decreases particular strength values for particular legitimate credentials when legitimate patterns for those particular legitimate credentials match a pattern for the failed credential.

19. The system of claim 17, wherein the credential analysis service ranks a complexity value for a pattern of the failed credential against other complexity values in the other metrics to determine whether a particular trend shows that attacks on the secure network are getting increasingly more sophisticated.

20. A system, comprising:
a password service implemented in a non-transitory machine-accessible and computer-readable medium and is to process on a machine; and
a intruder analysis service implemented in a non-transitory machine-accessible and computer-readable medium and is to process on the machine or a different machine;
wherein the password service supplies a failed password and user identifier received from a requesting user, who is attempting to login to a secure network, to the intruder analysis service, and wherein the intruder analysis service is to dynamically and automatically evaluate the failed password, in view of a data store of failed passwords historically maintained for previously failed passwords used to attempt access into the secure network, each previous failed password having a previously dynamically and automatically derived previous failed patters and the failed passwords and the failed patterns used for purposes of automatically and dynamically adjusting password policy for the secure network for legitimate passwords of the secure network.

21. The system of claim 20, wherein the intruder analysis service determines whether a pattern associated with the failed password matches known patterns used by intruders and when a match occurs rankings associated with the known patterns are updated.

22. The system of claim 21, wherein the intruder analysis service uses the pattern to derive a complexity value for the failed password and compares that complexity value against other complexity values for the known patterns to determine whether attacks on the network are getting more sophisticated.

23. The system of claim 22, wherein the intruder analysis service predicts a projected time that an intruder may compromise a valid password for a valid user, the valid user is associated with the user identifier, and wherein the intruder analysis service updates the policy to cause the valid user to be notified that the valid password should be changed to avoid it being compromised in the future.

* * * * *